United States Patent [19]

Nasserbakht et al.

[11] Patent Number: 5,796,995
[45] Date of Patent: Aug. 18, 1998

[54] CIRCUIT AND METHOD FOR TRANSLATING SIGNALS BETWEEN CLOCK DOMAINS IN A MICROPROCESSOR

[75] Inventors: Mitra Nasserbakht, Dallas; Patrick W. Bosshart, Plano, both of Tex.

[73] Assignee: Texas Instruments Incorporated, Dallas, Tex.

[21] Appl. No.: 810,175

[22] Filed: Feb. 28, 1997

[51] Int. Cl.$^6$ ............................................. G06F 1/12
[52] U.S. Cl. .................................................. 395/558
[58] Field of Search ................................ 395/556, 558, 395/559

[56] References Cited

U.S. PATENT DOCUMENTS 5,448,715  9/1995  Lelm et al. ............................. 395/559
5,692,166  11/1997  Milhizer et al. ................... 395/558 X

*Primary Examiner*—Thomas M. Heckler
*Attorney, Agent, or Firm*—Lee E. Chastain; James C. Kesterson; Richard L. Donaldson

[57] ABSTRACT

A microprocessor (5) including a clock domain translation circuit (50a) for communicating a digital signal from a high speed clock domain to a low speed clock domain is disclosed. The disclosed microprocessor (5) includes clock generation circuitry (20) which generates internal and bus clocks at different multiples of a system clock signal. The clock generation circuitry (20) includes a counter (60) that indicates, for a given frequency ratio, signals (REGION) indicating the current phase region of the faster clock (PCLK) relative to the slower clock (BCLK). The clock domain translation circuit (50a) includes a series of input registers (82, 84) in sequence, with the output of each as well as the input signal line (IN_PCLK) coupled to inputs of a multiplexer (80). The multiplexer (80) selects either the input signal directly or the output of one of the registers for application to an output register (90), clocked by the slower clock signal (BCLK), depending upon the phase region of the faster clock (PCLK) relative to the slower clock (BCLK) for communication of that signal. As a result, the input digital signal is held for enough time to be properly clocked in, depending upon the phase region, thus enabling frequency ratios of non-integer values to be utilized in system operation.

20 Claims, 4 Drawing Sheets

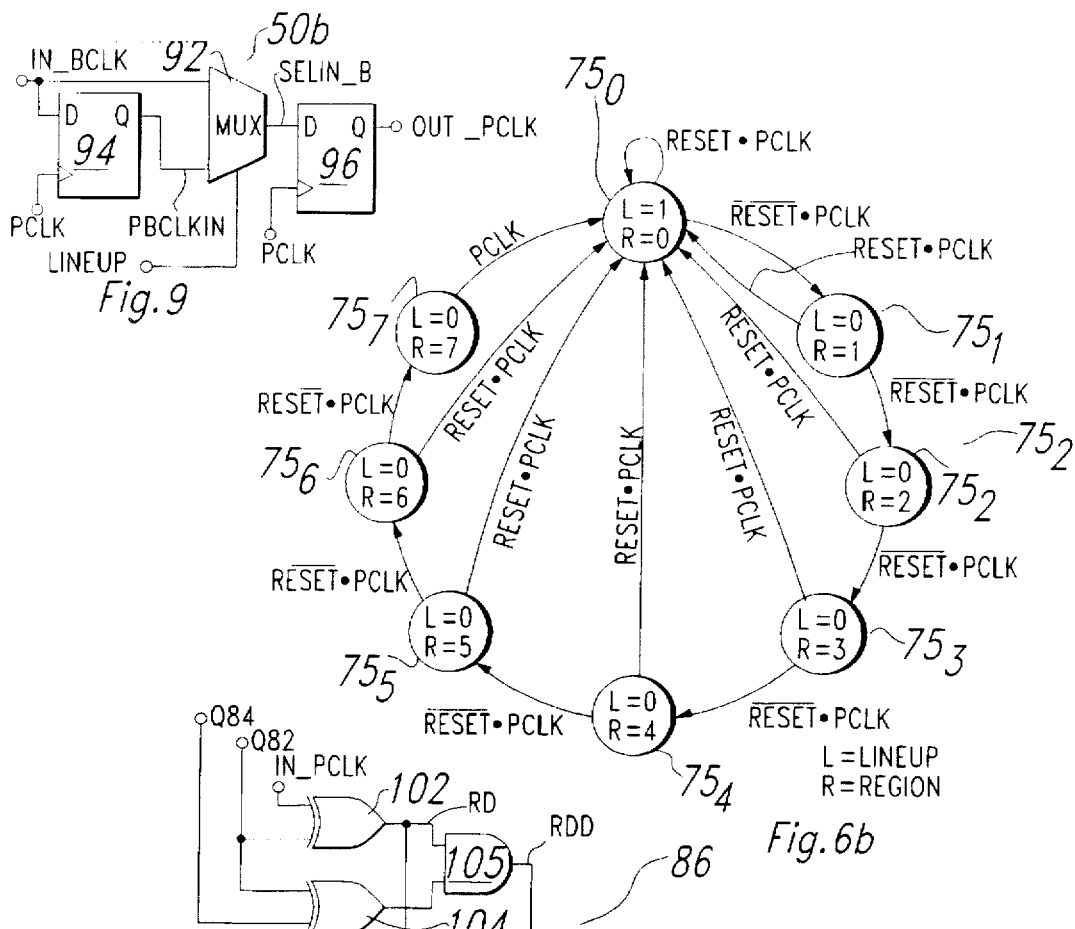
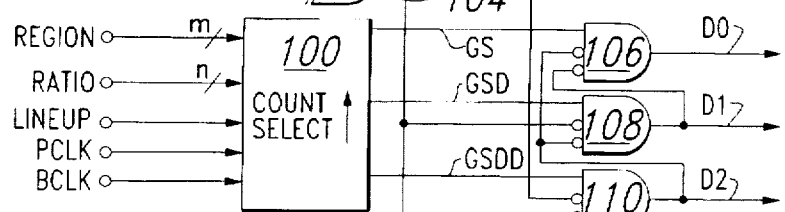
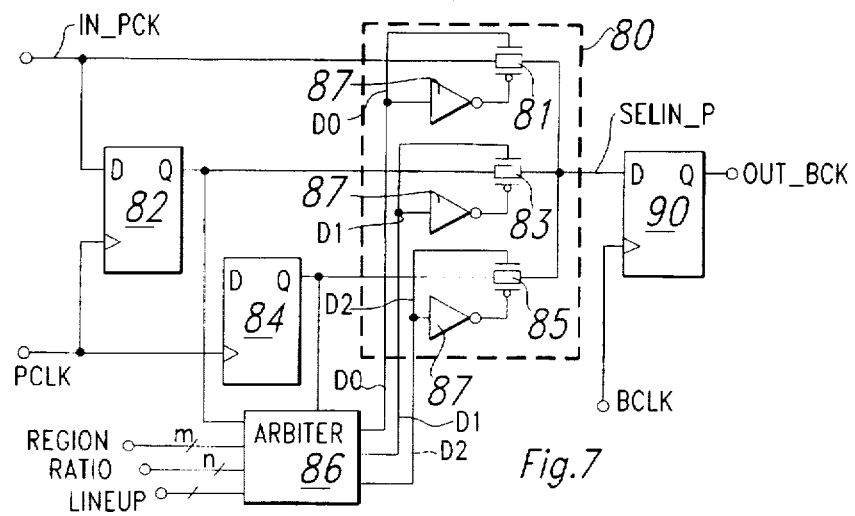

5,796,995

CIRCUIT AND METHOD FOR TRANSLATING SIGNALS BETWEEN CLOCK DOMAINS IN A MICROPROCESSOR

TECHNICAL FIELD OF THE INVENTION

This invention is in the field of integrated circuits for data processing systems, and is more specifically directed to interface circuits in microprocessors.

BACKGROUND OF THE INVENTION

Modern data processing systems typically include several VLSI (Very Large Scale Integrated) circuits of the synchronous type that perform complex data processing operations in the system. The synchronous nature of these integrated circuits means that their internal operations are controlled according to system clock signals. For example, a conventional microprocessor, serving as the central processing unit (CPU) for the system, is a synchronous integrated circuit in that it receives an external system clock signal, from which the microprocessor generates internal clock signals that control its operations, and may also generate clock signals, such as a bus clock (which is equivalent to the system clock), for controlling certain system operations.

As is known in the art, however, different subsystems operate at different maximum clock rates. For example, currently available microprocessors operate at core internal clock rates of up to 133 MHz, while other subsystems, such as main system memory or input/output functions, do not operate at this high clock rate. In addition, the clock frequencies at which the CPU and other subsystems operate are constantly changing, depending upon the functions being performed at the time. Accordingly, buses upon which signals are communicated among the various subsystems (including the CPU) typically operate at clock rates that are less than the maximum core clock rate of the CPU. As such, the CPU and other subsystems typically include interface circuitry that can translate signals between clock domains of different frequencies. These circuits are also conventionally referred to as synchronizers.

In modern microprocessor-based systems, for example, the CPU core and system bus clocks are generated to be at a selected frequency ratio. In many conventional systems, the CPU receives a system clock signal from which it generates both its internal core clock and also the slower bus clock, at a programmable frequency ratio, which may be either integer or non-integer. For example, ratios of 1, 2, 3, 5/3, 8/3, 5/2, 7/2 are typical clock ratios.

FIG. 1a illustrates a simple type of conventional signal translation circuit, or synchronizer, for communicating a signal from a high-speed clock domain, controlled by clock PCLK, to a lower-speed clock domain, controlled by clock BCLK, in which one of the available clock ratios (i.e., the ratio of the frequency of faster clock signal PCLK to slower clock signal BCLK) is 16/6 (or 8/3). In this example, the high speed clock PCLK may correspond to the internal core clock of a microprocessor, while the slower clock BCLK may correspond to a bus clock in the system. The translation circuit of FIG. 1a includes a series connection of D-type registers $R_1$ through $R_4$. Register $R_1$ receives the input signal INPCLK, which is in the PCLK domain (as indicated by the suffix "PCLK") at its D input, and receives clock signal PCLK at its clock input. The Q output of register $R_1$ is presented, on line Q1, to the D input of register $R_2$ which is also clocked by clock signal PCLK. The output of register $R_2$ is presented, in turn, to register $R_3$ (also clocked by clock signal PCLK), the output of which is presented to the D input of register $R_4$, which is clocked by slower clock signal BCLK. The Q output of register $R_4$ drives signal OUT BCLK, which is in the BCLK domain (as indicated by the suffix "BCLK"). In operation, register $R_1$ clocks in the signal on line INPCLK upon a rising edge of clock PCLK, presenting the state of line INPCLK on line Q1 after a propagation delay following the edge of clock PCLK. This state then propagates through registers $R_2$ and $R_3$ on successive rising edges of clock signal PCLK. Register $R_4$ then clocks in the state of its input (the output of register $R_3$ on line Q3) upon a rising edge of clock BCLK, to present, after a propagation delay, the original input signal on line OUT BCLK.

In the case of a non-integer clock frequency ratio, the phase relationship between clocks will not remain constant over successive cycles of the slower clock signal. Referring now to FIG. 1b, the relationship of faster clock PCLK to slower clock BCLK is illustrated, according to the 16/6 clock ratio in this example. For such a clock ratio, the delay $\delta_{P-B}$ between a rising edge of the faster clock signal to the next rising edge of the slower clock signal varies widely, such that signals in the PCLK domain will have varying minimum hold times, depending upon the particular phase relationship. For example, with reference to FIG. 1b, a signal in the PCLK domain that becomes available at PCLK rising edge E0 must be held for two additional rising edges (E1, E2) of clock signal PCLK until the next rising edge of clock signal BCLK; a PCLK domain signal that becomes valid at edge E1 need only be held for one additional rising edge (E2) before the next edge of clock signal BCLK occurs.

This variability in the delay period for translation of a clock signal from a faster clock domain to a slower clock domain generally requires the use of worst case design constraints, according to conventional techniques. For the example of FIG. 1b, a worst case design would require that every PCLK domain signal be held for an additional two rising edges, in order to prevent translation and synchronization errors, assuming that this is the worst case phase relationship for all of the available clock ratios. The synchronizer of FIG. 1a is designed according to this worst case condition, as registers $R_2$, $R_3$ ensure that every PCLK domain signal is held for two additional rising edges. According to this conventional technique, this two-cycle delay is enforced not only for phase regions for which the signal need not be held for two additional cycles, but also even for clock ratios that do not require that the signal be held for two additional cycles in any of their phases. As such, the performance of the system incorporating worst case design techniques is limited by the propagation delay that is inserted in each instance of signal translation in each clock ratio.

Other conventional approaches to this problem include limiting the clock ratio of the internal core clock to a certain ratio relative to the bus clock. This necessarily requires that the internal core clock be set at a frequency below its maximum, also resulting in limited system performance.

SUMMARY OF THE INVENTION

The present invention may be implemented into an integrated circuit in a data processing system, such as a microprocessor, and particularly into its bus interface circuitry. According to the present invention, circuitry is provided that determines the instantaneous phase relationship between the faster and slower clock signals in the system. Upon determination of the region, the translation circuit controls a multiplexer to apply, to an output register, the input signal after a selected number of pulses of the clock signal for the input clock domain; the output register is clocked by the clock signal for the output clock domain, so that the signal is then synchronized in its output clock domain.

It is an object of the present invention to provide such a clock translation circuit and method that enables the use of non-integer clock ratios, thus allowing the faster clock domain circuitry to operate at its maximum available rate.

It is a further object of the present invention to provide such a circuit and method that identifies clock cycles in which the two clock signals are substantially in phase with one another, so that the input signal is forwarded without delay when possible.

It is a further object of the present invention to provide circuits and methods of translation of signals both from fast-to-slow clock domains and also from slow-to-fast clock domains.

Other objects and advantages of the present invention will be apparent to those of ordinary skill in the art having reference to the following specification together with its drawings.

BRIEF DESCRIPTION OF THE DRAWINGS

FIG. 1a is an electrical diagram, in schematic form, of a translation circuit according to the prior art.

FIG. 1b is a timing diagram illustrating the relationship between clock signals as may be applied to the circuit of FIG. 1a.

FIG. 6b is a state diagram illustrating the operation of the counter of FIG. 6a for a selected clock ratio.

FIG. 7 is an electrical diagram, in schematic form, of a translation circuit for translating a signal from a faster clock domain to a slower clock domain, according to the preferred embodiment of the invention.

FIG. 8 is an electrical diagram, in schematic form, of the arbiter in the translation circuit of FIG. 7.

FIG. 9 is an electrical diagram, in schematic form, of a translation circuit for translating a signal from a slower clock domain to a faster clock domain, according to the preferred embodiment of the invention.

DETAILED DESCRIPTION OF THE PREFERRED EMBODIMENT

Figure 2:
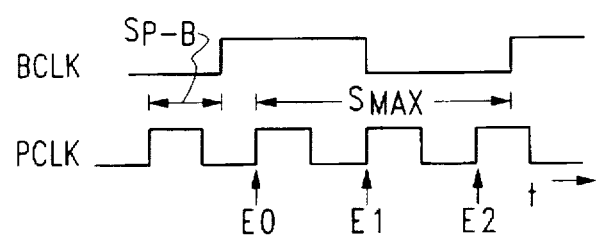
FIG. 2a is an electrical diagram, in block form, of a microprocessor-based system including a microprocessor according to the preferred embodiment of the invention.
FIG. 2b is an electrical diagram, in block form, of a microprocessor incorporating the preferred embodiment of the invention.
Figure 2A:
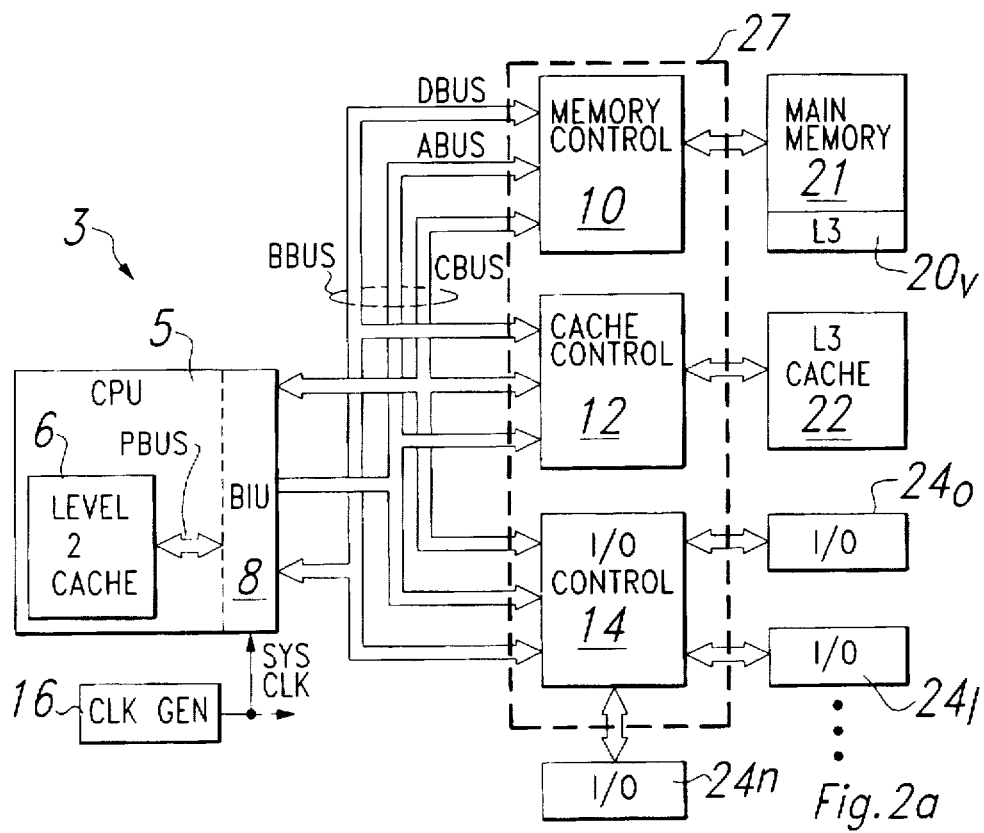

Referring to FIG. 2a, an exemplary microprocessor-based system 3 into which the preferred embodiment of the present invention is implemented will now be described in detail. As shown in FIG. 2a, system 3 includes microprocessor 5 which, in this embodiment of the invention, is a microprocessor of the well-known "x86-architecture", and is preferably a Pentium-class microprocessor. Microprocessor 5 serves as the central processing unit (CPU) of system 3, and includes, as a portion thereof, bus interface unit (BIU) 8. BIU 8 is circuitry within microprocessor 5 which serves to control and effect communication between microprocessor 5 and the remainder of system 3. In this embodiment of the invention, BIU 8 of CPU 5 is connected to bus BBUS, which includes address bus ABUS, data bus DBUS, and control bus CBUS. As is conventional in the art, address bus ABUS is a bus upon which CPU 5 presents a binary address to access other elements of system 3, data bus DBUS is a bus for the communication of digital signals between microprocessor 5 and the other system elements, and control bus CBUS is a bus by way of which control signals are communicated among the elements of system 3.

In system 3 of FIG. 2a, various peripheral elements are connected to bus BBUS, by way of associated controllers 10, 12, 14 implemented by way of chipset 27, to effect typical system functions. Main memory 21 of system 3 is coupled to bus BBUS by memory controller 10; as such, memory controller 10 receives address values and control signals from microprocessor 5, and presents corresponding control signals to main memory 21 to effect the desired operation, which generally involves the communication of data to or from microprocessor 5 on data bus DBUS. System 3 also includes level 3 cache memory 22, which is connected to cache controller 12 in the conventional manner; cache controller 12 is connected to bus BBUS to control the communication of data between microprocessor 5 and system cache memory 22. In this example, system cache memory 22 is a cache memory that provides a level of cache in system 3, beyond the levels of cache memory present within microprocessor 5 (e.g., on-chip cache 6 being shown in FIG. 2a as connected to BIU 8 via internal bus PBUS). System 3 also includes I/O controller 14 which is connected to microprocessor 5 via bus BBUS, and which is also connected to several input/output devices 24. Input/output devices 24 may include typical input and output peripherals in system 3, such as a video monitor, a keyboard and pointing device, disk drive subsystems, and the like. System 3 further includes clock generator circuit 16, which is an oscillator or other circuit that generates a periodic clock signal on line SYSCLK for presentation to microprocessor 5 via BIU 8, and from which internal and external clock signals are generated within each of the various system elements. Accordingly, it is contemplated that system 3 corresponds to a typical modern computer, such as of the desktop workstation or portable notebook type, in which computer programs are stored within disk storage (represented by one of input/output devices 24), and downloaded to main memory 21 for operation.

Figure 2B:
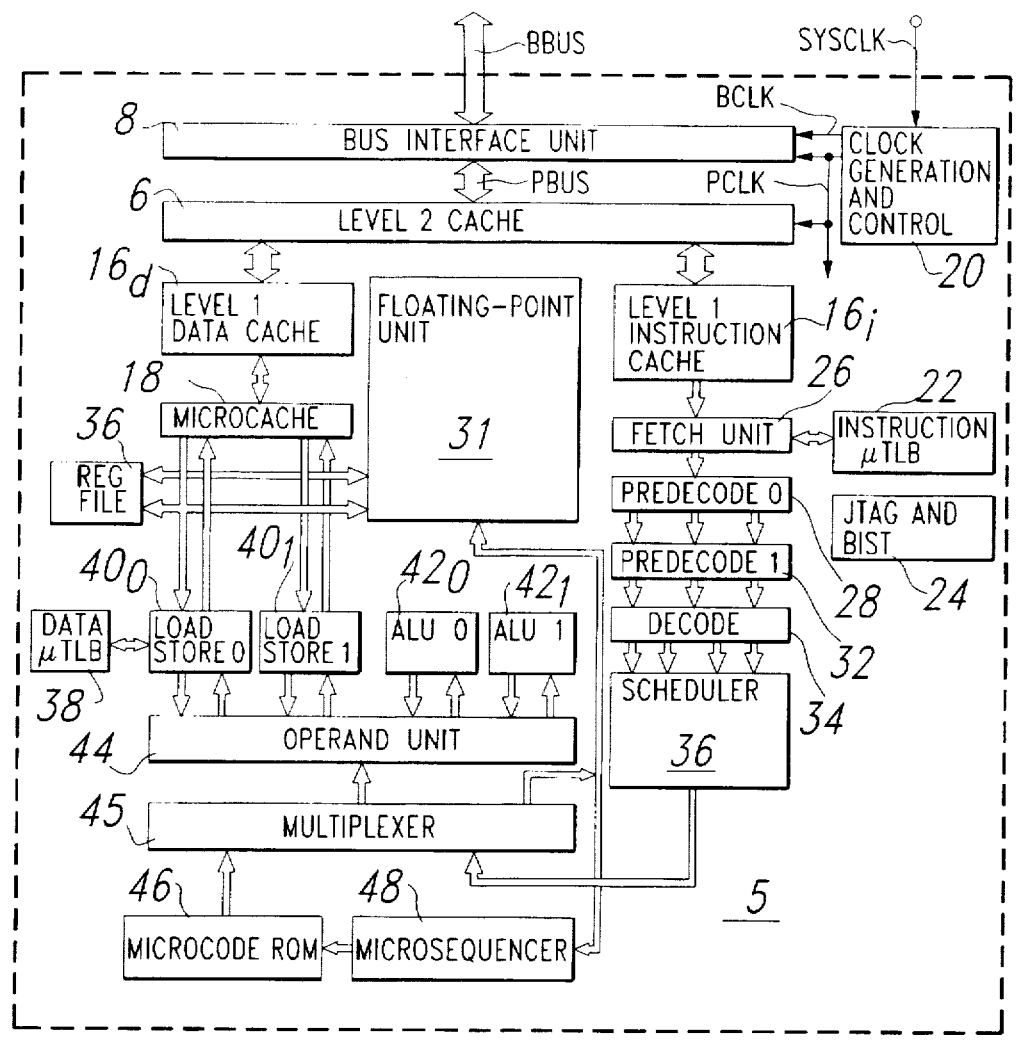

Referring now to FIG. 2b, microprocessor 5 according to the preferred embodiment of the invention is illustrated in block diagram form, and will now be described. As noted above, microprocessor 5 includes bus interface unit (BIU) 8 connected to bus BBUS, which controls and effects communication between microprocessor 5 and the other elements in system 3. BIU 8 includes the appropriate control and clock circuitry to perform this function, including write buffers for increasing the speed of operation, and including timing circuitry so as to synchronize the results of internal microprocessor operation with bus BBUS timing constraints. Microprocessor 5 also includes clock generation and control circuitry 20 which, in this example, generates clock phases (e.g., internal high-speed clock PCLK and bus clock BCLK) based upon system clock SYSCLK from clock generator circuit 16. As will be described hereinbelow, the frequency of the generated clock phases may be selectably programmed as a multiple of the frequency of the external clock, including non-integer multiples thereof.

As is evident in FIG. 2b, microprocessor 5 has three levels of internal cache memory, with the highest of these as level 2 cache 6, which is connected to BIU 8 by way of internal bus PBUS. In this example, level 2 cache 6 is a unified cache, and is configured to receive all cacheable data and cacheable instructions from bus BBUS via BIU 8, such that much of the bus traffic presented by microprocessor 5 is accomplished via level 2 cache 6. Of course, microprocessor 5 may also effect bus traffic around cache 6, by treating certain bus reads and writes as "not cacheable". Level 2 cache 6, as shown in FIG. 2b, is connected to two level 1 caches 16; level 1 data cache $16_d$ is dedicated to data, while level 1 instruction cache $16_i$ is dedicated to instructions. Microcache 18 is a fully dual-ported level 0 data cache, in this example.

As shown in FIG. 2b, microprocessor 5 is of the superscalar type, and thus includes multiple execution units. These execution units include two ALUs $42_0$, $42_1$ for processing conditional branch, integer, and logical operations, floating-point unit (FPU) 31, two load-store units $40_0$, $40_1$, and microsequencer 48. The two load-store units 40 utilize the two ports to microcache 18, for true parallel access thereto, and also perform load and store operations to registers in register file 39. Data microtranslation lookaside buffer (µTLB) 38 is provided to translate logical data addresses into physical addresses, in the conventional manner.

These multiple execution units are controlled by way of multiple pipelines of seven stages each, with write-back. The pipeline stages are as follows:

| | |
|---|---|
| F | Fetch: This stage generates the instruction address and reads the instruction from the instruction cache or memory |
| PD0 | Predecode stage 0: This stage determines the length and starting position of up to three fetched x86-type instrucitons |
| PD1 | Predecode stage 1: This stage extracts the x86 instruction bytes and recodes them into fixed length format for decode |
| DC | Decode: This stage translates the x86 instructions into atomic operations (AOps) |
| SC | Schedule: This stage assigns up to four AOps to the appropriate execution units |
| OP | Operand: This stage retrieves the register operands indicated by the AOps |
| EX | Execute: This stage runs the execution units according to the AOps and the retrieved operands |
| WB | Write-back: This stage stores the results of the execution in registers or in memory |

Referring back to FIG. 2b, the pipeline stages noted above are performed by various functional blocks within microprocessor 5. Fetch unit 26 generates instruction addresses from the instruction pointer by way of instruction microtranslation lookaside buffer (µTLB) 22, for application to level 1 instruction cache $16_i$. Instruction cache $16_i$ produces a stream of instruction data to fetch unit 26, which in turn provides the instruction code to predecode 0 stage 28 and predecode 1 stage 32 in the desired sequence. These two stages operate as separate pipeline stages, and together operate to locate up to three x86 instructions and apply the same to decoder 34. Predecode 0 stage 28 determines the size and position of as many as three variable-length x86 instructions, while predecode 1 stage 32 recodes the multibyte instructions into a fixed-length format to facilitate decoding. Decode unit 34, in this example, contains four instruction decoders, each capable of receiving a fixed length x86 instruction from predecode 1 stage 32 and producing from one to three atomic operations (AOps), which are substantially equivalent to RISC instructions. Scheduler 36 reads up to four AOps from the decode queue at the output of decode unit 34, and assigns these AOps to the appropriate execution units. Operand unit 44 receives an input from sequencer 44 and also from microcode ROM 46, via multiplexer 45, and fetches register operands for use in the execution of the instructions. In addition, according to this example, operand unit 44 also performs operand forwarding to send results to registers that are ready to be stored, and also performs address generation for AOps of the load and store type.

Microsequencer 48 and microcode ROM 46 control ALUs 42 and load/store units 40 in the execution of microcode entry AOps, which are generally the last AOps to execute in a cycle. In this example, microsequencer 48 sequences through microinstructions stored in microcode ROM 46, to effect control responsive to microcoded microinstructions such as complex or rarely-used x86 instructions, x86 instructions that modify segment or control registers, handling of exceptions and interrupts, and multi-cycle instructions (such as REP instructions, and instructions that PUSH and POP all registers).

Microprocessor 5 also includes circuitry 24 for controlling the operation of JTAG scan testing, and of certain built-in self-test functions, ensuring the validity of the operation of microprocessor 5 upon completion of manufacturing, and upon resets and other events.

As noted above, BIU 8 provides the function of communicating data between internal portions of microprocessor 5 and the remainder of the system. As such, BIU 8 communicates data between internal bus PBUS and external bus BBUS, through buffer functions commonly referred to as write buffers or read buffers, depending upon the direction of data transfer effected by each. In this example of microprocessor 5, internal bus PBUS is clocked according to a high speed internal clock PCLK, while external bus BBUS is clocked according to a lower speed bus clock BCLK.

Figure 3:
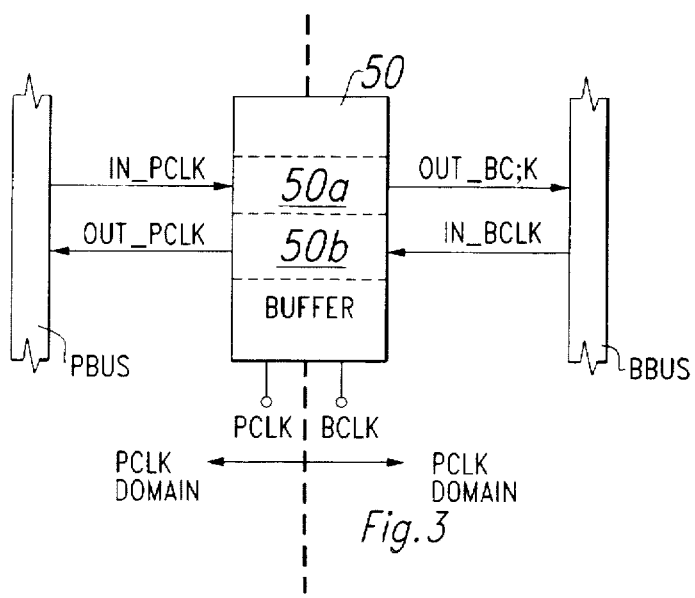
FIG. 3 is an electrical diagram, in block form, of a clock generator circuit in the microprocessor of FIG. 2b.

Referring now to FIG. 3, buffer 50 is illustrated in block form to provide further description of the interface function of BIU 8. Buffer 50 in this example is a multiple bit buffer for communicating data, address, or control signals between internal bus PBUS and external bus BBUS. As shown in FIG. 3, the so-called PCLK domain includes internal bus PBUS and internal clock signal PCLK; for each of its signal lines (only one of which is shown in FIG. 3), internal bus PBUS presents a digital signal to buffer 50 by way of line IN PCLK, and receives a digital signal from buffer 50 on line OUTPCLK, both events clocked by internal clock signal PCLK. Similarly, for each signal line in the BCLK domain, external bus BBUS presents a digital signal to buffer 50 on line INBCLK, and receives a digital signal from buffer 50 on line OUTBCLK, both events clocked by bus clock BCLK. While the preferred embodiment of the invention is most applicable to the case where digital signals INBCLK, OUT BCLK, INPCLK, OUTPCLK that are translated by buffer 50 are control signals communicated by buses PBUS, BBUS, as appropriate, it will be appreciated that the present invention may also be applied to advantage in the translation of data and address signals. In any case, the signal is applied to its corresponding bus in a manner that is clocked by the clock signal for its domain. For example, a signal is driven on bus PBUS, and thus on line INPCLK, by the presentation of the signal from the appropriate internal circuit of microprocessor 5 in conjunction with a rising edge on line PCLK. As such, the signals on lines INPCLK and INBCLK in this example are clocked signals, synchronous with their respective PCLK, BCLK signals.

Figure 1:
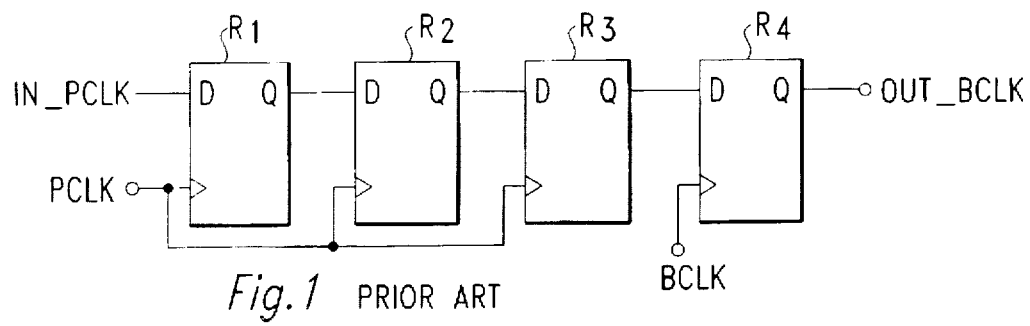

In operation, in the general sense, buffer 50 communicates signals from one domain (source) to the other domain (destination) by receiving an input signal on line IN BCLK or INPCLK, as the case may be, with an edge (typically a rising edge) of the clock signal BCLK, PCLK, corresponding to the source domain. Buffer 50 will then present that signal to the destination clock domain on the appropriate output signal line OUTPCLK, OUTBCLK at an edge (again, typically a rising edge) of the corresponding clock signal PCLK, BCLK for the destination domain. As in the case of FIG. 1a described hereinabove, the phase relationship of clock signals PCLK, BCLK affects the operation of signals communicated between clock domains.

As indicated in FIG. 2b, clock generation and control circuit 20 generates clock signals PCLK, BCLK (and may generate other clock signals, not shown, for use within microprocessor 5), based upon the external clock signal SYSCLK presented thereto. Clock BCLK is generated by clock generation and control circuit 20 to serve as the bus clock signal for synchronous operation of external bus BBUS by microprocessor 5 itself, and is presented externally for use also by the other subsystems connected to bus BBUS.

Figure 4:
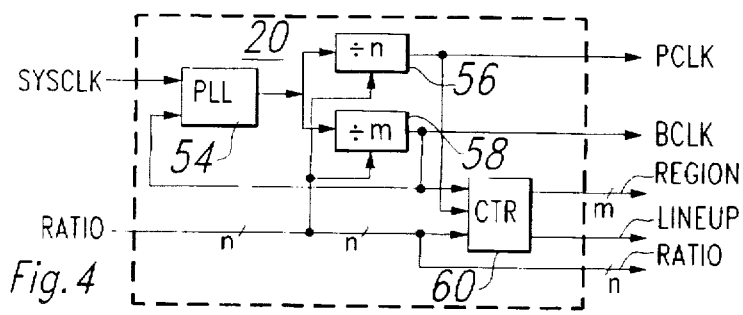
FIG. 4 is an electrical diagram, in block form, of an interface circuit in the microprocessor of FIG. 2b incorporating the preferred embodiment of the invention.

Referring now to FIG. 4, the construction and operation of clock generator circuit 20 will now be described. Clock generator circuit 20 includes phase-locked loop (PLL) 54 constructed in the conventional fashion. PLL 54 receives the external clock signal SYSCLK at one input, and provides an output to each of frequency dividers 56, 58. Frequency dividers 56, 58 are preferably programmable frequency dividers for dividing the frequency of the output of PLL 54 by values n, m respectively, as provided on lines RATIO from a configuration register in microprocessor 5. The values n and m may be integer or non-integer values, and may be either greater or less than unity. In this example, the value m is greater than n, such that the output of frequency divider 58 on line BCLK is at a lower frequency than the output of frequency divider 56 on line PCLK. The output clock signal on line BCLK is presented as a feedback input to PLL 54.

The values of m, n that are selected for use in clock generator and control circuit are, as noted above, preferably programmed into a configuration register, or into another memory location or register used in the control of microprocessor 5. According to this embodiment of the invention, it is preferable that the values of m, n be selected according to a selected one of a group of ratio values. The present invention provides great flexibility in the relative clock frequencies of PCLK, BCLK, however. For example, clock ratios of 1, 2, 3, 5/3, 8/3, 5/2, 7/2 are contemplated for use in connection with the preferred embodiment of the invention. It has been observed that, for purposes of controlling communications through buffer 50 between clock domains, that the 16/6 (or 8/3) clock ratio is the worst case ratio from the above set, as it results in the highest number of possible phase regions as compared to the other clock ratios in this set.

According to this preferred embodiment of the invention, clock generator and control circuit 20 also includes counter 60 which determines the phase relationship between clock signals PCLK, BCLK, and generates signals on lines REGION and LINEUP. Lines REGION are, in this embodiment of the invention, three signal lines carrying a value indicating the current phase relationship of clock signals PCLK, BCLK since eight distinct phase regions are possible; line LINEUP is, in this example, a single line for carrying a signal indicating when the rising edges of clock signals PCLK, BCLK coincide. Counter 60 may be implemented as a conventional counter that counts edges of the faster clock signal PCLK, and thus counts phase regions, up to a limit determined by the clock ratio presented thereto on lines RATIO. For the example of a 16/6 clock ratio, the count limit of counter 60 will be eight, since there are eight phase regions between each instance of coincident rising edges of clock signals PCLK, BCLK.

Figure 5:
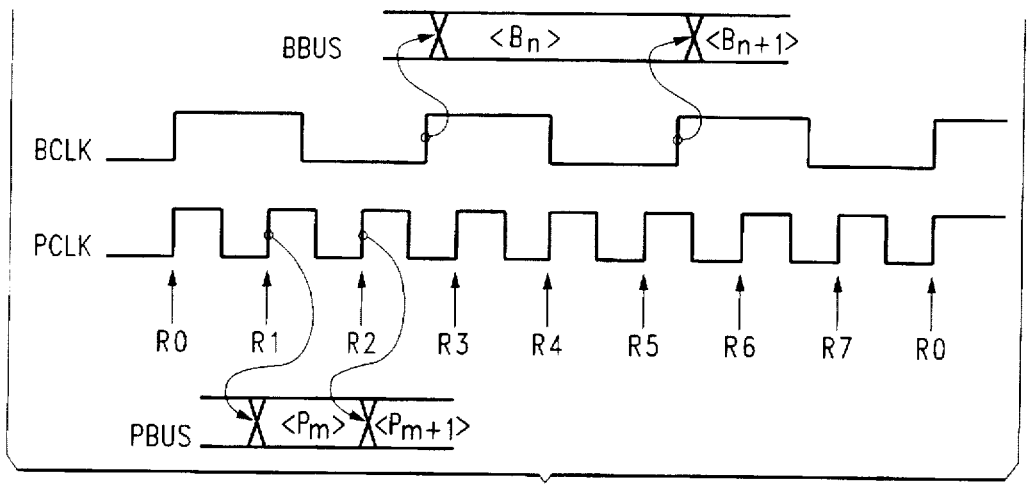
FIG. 5 is a timing diagram illustrating the phase relationship regions of clock signals for clock domains which may be utilized in connection with the present invention.

Attention is now directed to FIG. 5, which illustrates the phase relationship of the two clock signals PCLK, BCLK, and also their control of address, data, and control signals on buses PBUS, BBUS, respectively. According to this embodiment of the invention, as is typical for synchronous digital logic circuits and systems, the data on a particular synchronous bus is presented synchronously with a clock edge, and remains valid for a period of time corresponding to a cycle of its corresponding clock edge. For example, as shown in FIG. 5, a data word $P_m$ (which may include data signals, and also address and control signals, as the case may be) becomes valid on bus PBUS immediately after a rising edge of clock signal PCLK, as this data word $P_m$ is clocked from its source onto bus PBUS by that rising edge. Bus PBUS holds data word $P_m$ as valid until the next rising edge of clock signal PCLK, at which time the next data word $P_{m+1}$ is clocked onto bus PBUS. Bus BBUS operates in a similar fashion, as shown in FIG. 5, as valid data word $B_n$ is clocked from its source bus master onto bus BBUS with a rising edge of clock signal BCLK, and remains on bus BBUS until the next edge of clock signal BCLK when, in this example, the next data word $B_{n+1}$ is clocked onto the bus.

Referring to FIG. 5 in combination with generalized buffer 50 of FIG. 3, the various phase regions presented by the worst case 16/6 clock ratio according to the preferred embodiment of the invention will now be described. This clock ratio is the worst case in that it results in the highest number of phase relationship regions for the set of clock ratios listed hereinabove. It is contemplated, of course, that one of ordinary skill in the art having reference to this specification will be able to similarly identify the various phase regions between clocks of different speeds for different clock ratios than that presented herein.

It will become apparent, from the following description, that the various phase relationships of the BCLK and PCLK clock signals most directly affect the transfer of signals from the faster PCLK clock domain to the slower BCLK clock domain. This is because additional rising edges of the faster PCLK clock signal may occur after signals are presented in the PCLK domain, but before the next rising edge of the slower BCLK clock signal. Conversely, for signal translation from the slower BCLK clock domain to the faster PCLK clock domain, a rising edge of the faster destination clock domain clock signal PCLK will always occur prior to the next rising edge of the slower BCLK clock signal in the source domain. As such, the effect of the various phase regions in the example shown in FIG. 5 will be described for signal translation from the faster PCLK clock domain to the slower BCLK clock domain. In each case, counter 60 presents a signal indicating the current phase region on lines REGION.

FIG. 5 illustrates the phase relationship between the faster clock signal PCLK and the slower clock signal BCLK as generated by clock generation and control circuit 20 over a series of clock cycles, beginning with a cycle in which clock signals BCLK, PCLK are in phase alignment with one another. This coincidence of the rising edges of PCLK and BCLK corresponds to phase region R0, as will be indicated on lines REGION by a 0 value and by an asserted signal on line LINEUP, both generated by counter 60. In this case, a signal presented onto bus PBUS by a rising edge of clock signal PCLK will not have propagated through buffer 50 until after the coincident rising edge of clock signal BCLK is complete. As such, the signals on bus PBUS must be held in buffer 50, in this example, for two additional cycles of PCLK before the next rising edge of clock signal BCLK occurs.

The next cycle of the faster clock signal PCLK, after the lineup condition of phase region R0, is shown in FIG. 5 as phase region R1; in this region, any signals to be communicated by buffer 50 from the PCLK domain to the BCLK domain must be held for an additional rising edge of the PCLK signal before the next rising edge of clock signal BCLK occurs. The next cycle of clock signal PCLK is shown in FIG. 5 as phase region R2, in which signals in the PCLK domain presented with this edge will be received by the next rising edge of clock signal BCLK, which occurs prior to the next rising edge of clock signal PCLK.

The next cycle of clock signal PCLK is in phase region R3. In this region, any signal in the PCLK domain must be held for the next two rising edges of the PCLK clock signal occurring prior to the next rising edge of the BCLK clock signal. The next cycle of clock signal PCLK corresponds to phase region R4 which, similarly as phase region R1, requires the signal to be held for one additional cycle of clock signal PCLK. The next cycle of clock signal PCLK is in phase region R5, in which the signal need only be held for the present cycle, as a rising edge of clock signal BCLK will occur prior to the next PCLK rising edge. The remaining cycles of clock signal PCLK correspond to phase regions R6, R7 in which the signal from the PCLK domain is held for one additional PCLK clock cycle. The following cycle of clock signal PCLK is thus in a lineup condition, and the eight phase region cycle for this example of the 16/6 clock ratio then repeats.

Figure 6A:
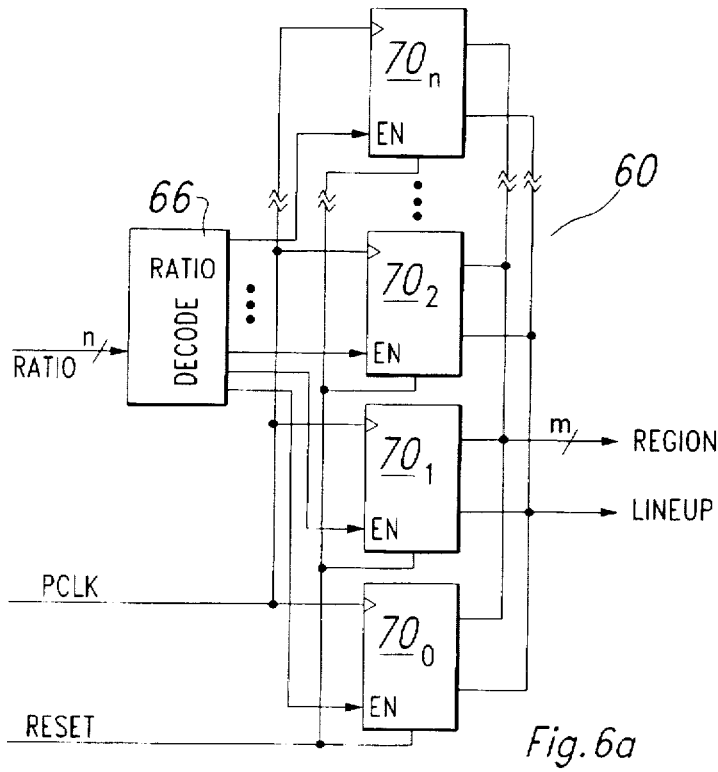
FIG. 6a is an electrical diagram, in schematic form, of the counter in the interface circuit of FIG. 4.

Given the above description of the phase regions for this clock ratio, FIGS. 6a and 6b illustrate the construction of counter 60 according to the preferred embodiment of the invention. As shown in FIG. 6a, counter 60 includes multiple state counters 70, one for each possible clock ratio. Each of state counters 70 have a reset input receiving a signal on line RESET, a clock input receiving clock signal PCLK, and an enable input. Ratio decoder 66 receives the clock ratio signal on lines RATIO, and asserts one of its outputs responsive to the value of the clock ratio signal. The outputs of ratio decoder 66 are connected to respective ones of state counters 70. Each state counter 70 presents multiple outputs which are wired-OR connected to drive a phase region signal on lines REGION. Each state counter 70 is preferably implemented in sequential logic which advances from one state to the next responsive to an edge of clock signal PCLK. Lines REGION will typically drive a digital encoded signal with the phase region driven by the enabled one of state counters 70; the non-enabled state counters 70 will have their outputs forced low, given the wired-OR output connection. Each of state counters 70 also drives a signal at another output that is wired-OR connected among state counters 70 to drive line LINEUP. State counters 70 are resettable responsive to line RESET, preferably generated by PLL 54, based upon which operation may be initiated in the proper phase region.

Referring now to FIG. 6b, the operation of state counter $70_2$, operable for the worst case clock ratio of 16/6, will now be described in detail by way of a state diagram, by way of example. It is contemplated that state counters 70 for other clock ratios may readily be constructed by one of ordinary skill in the art having reference to this specification. In the clock ratio of 16/6, clock signals PCLK, BCLK may be in any one of eight phase relationships, as will be described in further detail hereinbelow. As such, state counter $70_2$ has eight states $75_0$ through $75_7$. State counter 70 thus issues three output lines REGION, upon which the phase region value will be digitally encoded, and will issue a single output on line LINEUP.

As shown in FIG. 6b, in reset state $75_0$, state counter $70_2$ will issue a high logic level on line LINEUP and will issue a 000 value on lines REGION (indicating phase region R0). Upon the next edge of clock signal PCLK in combination with line RESET not being asserted, state counter will advance to state $75_1$ and issue both a low logic level on line LINEUP and also the digital value 001 on lines REGION, corresponding to phase region R1. Another edge of clock signal PCLK in combination with the absence of a reset signal (i.e., line RESET being low) advances state counter $70_2$ to state $75_2$, driving line LINEUP low and driving a digital value of 010 (indicating phase region R2) on lines REGION. Additional edges of clock signal PCLK in the absence of a reset will advance the state of state counter 70 in similar fashion, advancing the digital value of the output on lines REGION and maintaining line LINEUP low. In any state, if line RESET is asserted in combination with an edge on clock signal PCLK, control returns to state $75_0$ (line LINEUP high and REGION value of 000). Once state $75_7$ is reached, the edge of clock signal PCLK will unconditionally advance to state $75_0$, asserting line LINEUP and setting a digital value of 000 on lines REGION to indicate phase region R0.

Based on the foregoing description, one may thus tabulate the various phase regions and signal hold operations for translation from the faster PCLK domain to the slower BCLK domain for this clock ratio as follows:

| Phase regions | State of state counter $70_2$ | Number of PCLK edges to hold signal |
|---|---|---|
| R1, R4, R6, R7 | $75_1$, $75_4$, $75_6$ | Hold for one PCLK cycle |
| R0, R3 | $75_0$, $75_3$ | Hold for two PCLK cycles |
| R2, R5 | $75_2$, $75_5$, $75_7$ | Hold until next BCLK |

The control of signal translation by buffer 50 according to these operations will be described in further detail hereinbelow, for the case of the 16/6 clock ratio by way of example.

Referring now to FIG. 7, the construction and operation of buffer circuit 50a, which is a portion of buffer 50 that transfers a signal from the faster PCLK clock domain to the slower BCLK clock domain, will now be described in detail. Buffer circuit 50a is responsive to the signals on lines REGION, RATIO, and LINEUP as produced by counter 60 in clock generation and control circuit 20, in transferring a signal from line INPCLK from the PCLK domain to line OUTBCLK in the BCLK domain.

As shown in FIG. 7, signal line INPCLK is received from bus PBUS and is applied to pass gate 81 in multiplexer circuit 80, and also to the D input of register 82. The Q output of register 82 is applied to pass gate 83 in multiplexer 80, and also to the D input of register 84 (which has its Q output applied to pass gate 85 in multiplexer 80). Registers 82, 84 are clocked by clock signal PCLK. The outputs of pass gates 81, 83, 85 are tied together at line SELINP, which is applied to the D input of register 90. Register 90 is clocked by clock BCLK, and drives line OUTBCLK to bus BBUS at its Q output; as such, register 90 is a register for storing the state of the signal to be presented on bus BBUS in the fashion discussed hereinabove relative to FIG. 5. Each of pass gates 81, 83, 85, in multiplexer 80 is of complementary construction consisting of parallel p-channel and n-channel transistors, controlled by a control signal (generated in complementary fashion by a corresponding inverter 87 as shown in FIG. 7).

According to this construction, multiplexer 80 selects from among line INPCLK and the outputs of registers 82, 84 for application to the D input of register 90. Control of the selection of these various functions is performed by arbiter 86. Arbiter 86 receives lines REGION, RATIO and LINEUP at its inputs, and decodes these signals into three mutually exclusive control signals D0, D1, D2 that control pass gates 81, 83, 85, respectively.

Buffer circuit 50a is thus able to apply the input signal IN PCLK to output line OUTBCLK in several ways. Control signal D0, when selected, applies line INPCLK to the D input of register 90, such that its state will be presented upon line OUTBCLK upon being clocked in by a rising edge of clock signal BCLK. Control signal D1 presents the signal on line INPCLK to the D input of register 90 only after the occurrence of an intervening rising edge of clock signal PCLK that has latched the state of INPCLK into register 82. Control signal D2 applies the output of register 84, which is the state of line INPCLK after two intervening rising edges of clock signal PCLK (i.e., operating upon registers 82, 84 in turn), to the D input of register 90. As such, buffer circuit 50a is operable to selectively apply the state of line IN PCLK to line OUTBCLK upon the next rising edge of clock signal BCLK after zero, one or two intervening rising edges of clock signal PCLK. To effect this operation, arbiter 86 includes the appropriate decode circuitry to decode the phase region indicator on lines REGION for the current clock ratio signal on lines RATIO, along with the signal on line LINEUP, to assert the appropriate one of the control signals D0, D1, D2 to effect the proper transfer of the signal in the manner shown in the foregoing table.

Referring now to FIG. 8, the construction of arbiter 86 according to this preferred embodiment of the invention will now be described in detail. Arbiter 86 includes counter and select circuit 100, which receives the phase region indicator signals on lines REGION, along with the current clock ratio signal on lines RATIO and the signal on line LINEUP; counter and select circuit 100 further receives the clock signals on lines PCLK, BCLK. Counter and select circuit 100, in response to these signals, asserts a selected one of its select outputs GS, GSD, GSDD, from which the multiplexer control signals D0, D1, D2 are derived; select outputs GS, GSD, GSDD respectively indicate, when asserted, whether the signal on line INPCLK, the output of register 82, or the output of register 84, is to be applied to the data input of register 90 for a particular translation operation. The lineup signal LINEUP may be used by counter and select circuit 100 both in generating the proper multiplexer control signal, and also to ensure proper operation of the counter therein. Counter and select circuit 100 maintains the appropriate select output GS, GSD, GSDD for the duration of the transfer (i.e., over subsequent rising edges of clock signal PCLK), until clock signal BCLK makes a transition, at which time the signal translation will have been completed.

Arbiter 86 also includes logic for ensuring that the timing of the appropriate select signal D0, D1, D2 is controlled to be consistent with the receipt of the input signal. To this end, exclusive-OR gate 102 receives input line INPCLK at one input and the output of register 82 (line Q82) at its other input, and drives line RD at its output. Line RD is be driven high whenever the input signal on line INPCLK differs from the state of register 82, which occurs in the first cycle of PCLK after a logic transition on line INPCLK (i.e., before the new level on line INPCLK is latched into register 82). Similarly, exclusive-OR gate 104 receives the output of register 82 on line Q82 at one input, receives the output of register 84 at its other input, and drives one input of AND gate 105 with its output; the other input of AND gate 105 receives line RD from exclusive-OR gate 102. The output of AND gate 105, on line RDD, is thus driven to a high logic level whenever both the output of register 82 differs from the state of input line INPCLK and the output of register 84 differs from the output of register 82; this condition occurs if a logic transition occurs on line INPCLK in the first cycle after a previous transition has been latched into register 82 (but not yet latched into register 84).

Arbiter 86 includes AND gate 106 having an input connected to line GS and inverting inputs receiving multiplexer control signals D1, D2. AND gate 106 drives multiplexer control signal D0 at its output responsive to receiving an asserted signal on line GS from count and select circuit 100 in combination with neither of lines D1, D2 being asserted; this logical operation ensures that pass gate 81 is not turned on while one of the other pass gates 83, 85 is also on. AND gate 108 receives line GSD at one input, and receives line RD and line D2 at inverting inputs; as such, AND gate 108 asserts multiplexer control signal D1 high to select pass gate 83 upon receiving the asserted signal on line GSD from counter and select circuit 100 in combination with neither of lines RD or D2 being high. Pass gate 83 will therefore not be turned on while pass gate 81 is on, nor will it be turned on if a new transition has been received at input line INPCLK that has not yet been latched into register 82. Finally, arbiter 86 includes AND gate 110 that drives line D2 at its output responsive to line GSDD received at one of its inputs, along with its inverting inputs that receive line RDD and line RD. Accordingly, AND gate 110 asserts multiplexer control signal D2 to select pass gate 85 responsive to counter and select circuit 100 asserting the GSDD line in combination with neither of lines RD or RDD being asserted; this prevents pass gate 85 from being turned on if register 84 has not yet latched in a transition at line INPCLK (line RD high) or that has been latched into register 84 (line RDD high). Arbiter 86 thus ensures proper control of multiplexer 80 for the particular transfer operation.

Referring back to FIG. 5, the operation of buffer circuit 50a will now be described for the example of the 16/6 clock ratio which, as noted above, presents eight possible phase regions in the relationship of the two clock signals PCLK, BCLK. In this case, signals indicating the 16/6 clock ratio are presented to arbiter 86 on lines RATIO. As described above, arbiter 86 detects that a signal transfer from the PCLK domain to the BCLK domain is to occur in conjunction with a rising edge on line PCLK. Arbiter 86 will determine the phase region in which the transfer is initiated, and in response thereto, asserts the appropriate multiplexer control signal D0, D1, D2 for the control of multiplexer 80 for the duration of the transfer operation (i.e., until the next BCLK rising edge clocks in the signal at the input of register 90).

A signal that is clocked onto bus PBUS by a rising edge of clock signal PCLK in phase regions R1, R4, R6 and R7, in this example for the clock ratio of 16/6, is to be held for one additional rising edge of clock signal PCLK before the next rising edge of clock signal BCLK becomes available to clock this signal onto bus BBUS. Phase region R7 is included in this set of phase regions, despite the lineup condition of the next PCLK edge, to ensure that unstable operation does not result from slight clock skews. Therefore, in these clock regions, arbiter 86 will assert control signal D1 to select the output of register 82 for application to the D input of register 90. Because of this selection, and because one rising edge of clock signal PCLK will occur before the next rising edge of clock signal BCLK (which may change the state of bus PBUS), the desired signal on line IN PCLK will be stored by register 82 and presented to the D input of register 90 prior to the rising edge of clock signal BCLK.

For phase region R3 and also in response to the LINEUP signal (or, alternatively or in combination with, the value for phase region R0 on lines REGION) for the 16/6 clock ratio, arbiter 86 will assert control signal D2 to select the output of register 84 for application to the input of register 90. In this condition, the state of line INPCLK is held by buffer 50a for two rising edges of PCLK before being clocked onto bus BBUS by clock signal BCLK. For PBUS signals clocked in at phase regions R2 and R5 for the 16/6 clock ratio, arbiter 86 will assert the D0 clock signal to select the state of line INPCLK for application to the D input of register 90; since the state of line INPCLK is held for a full cycle of clock signal PCLK, its logic state will be clocked onto bus BBUS with the next rising edge of clock signal BCLK which occurs prior to the next PCLK rising edge in these phase regions.

In summary, the operation of buffer circuit 50a for the 16/6 clock ratio case may be tabulated as follows:

| Phase regions | Number of PCLK edges to hold signal | Control signal asserted |
| --- | --- | --- |
| R1, R4, R6, R7 | Hold for one PCLK cycle | D1 |
| R3 | Hold for two PCLK cycles | D2 |
| R0, R2, R5 | Hold until next BCLK | D0 |

It is contemplated that one of ordinary skill in the art, having reference to this specification, will be readily able to similarly derive proper control for buffer circuit 50a for the remaining clock ratios in the set of ratios noted above, and to similarly derive such control and to modify buffer circuit 50a (if necessary) to similarly control the translation of a signal from a faster clock domain to a slower clock domain for other clock ratios, as well.

Referring now to FIG. 9, buffer circuit 50b, which is a part of buffer 50 of FIG. 3 for transferring a signal from the slower BCLK clock domain to the faster PCLK clock domain, will now be described. As noted above, in this case, control is simplified considering that a rising edge of the destination clock signal PCLK will always occur prior to the next rising edge of the clock signal BCLK in the source clock domain. As such, buffer circuit 50b includes a simple two-input multiplexer 92 (preferably constructed as complementary pass gates, similarly as described hereinabove for buffer circuit 50a of FIG. 9). One input to multiplexer 92 is line INBCLK itself, which is the signal line from bus BBUS, and which carries a signal that is presented on bus BBUS synchronously with a rising edge of clock signal BCLK. Line INBCLK is also presented to the D input of register 94, which is clocked by destination clock signal PCLK; the output of register 94, on line PBCLKIN, is presented as the second input to multiplexer 92. The output of multiplexer 92 is connected to the D input of register 96, which in turn drives line OUTPCLK from its output. Line LINEUP from counter 60 in clock generation and control circuitry 20 serves as the control signal for multiplexer 92, and complementarily selects between the two inputs to multiplexer 92 for application to register 96.

In operation, line INBCLK is controlled by multiplexer 92 to be directly presented to register 96 only when the rising edges of clock signals PCLK, BCLK are not coincident (i.e., only when the LINEUP signal is not asserted). This connection is permitted because the valid state of line INBCLK will remain valid until the next rising edge of clock signal BCLK, prior to which a rising edge of clock signal PCLK will have occurred (see, e.g., the phase relationship of FIG. 5). For situations in which the rising edges of clock signals PCLK and BCLK are coincident, line LINEUP will be asserted and multiplexer 92 will select the output of register 94 for application to the input of register 96. In other words, the prior state of line INBCLK (i.e., prior to the most recent coincident edges of clock signals BCLK, PCLK) will be presented to register 96 at this time. This operation of multiplexer 92 during lineup conditions ensures that at least one full cycle of clock signal PCLK occurs prior to latching the signal on line INBCLK into register 96, to avoid any instability that may occur by register 96 clocking in a signal that is simultaneously undergoing a logic level transition (as may occur in the coincident situation.). Given that the frequency of clock signal PCLK is relatively high, any loss of performance due to retention of the signal on line IN BCLK for this additional PCLK cycle is minimal, especially considering the benefit of stable operation.

According to the present invention, therefore, translation of data, address, and control signals from one clock domain into another is obtained in a manner that allows for a wide range of clock frequency ratios between the clocks controlling the various domains. When implemented into data processing systems, this feature enables various subsystems, including the central processing unit, to more nearly approach their maximum operating performance, as the clock frequency of the faster subsystems and circuits need not be held back to non-aggressive clock ratios relative to slower subsystem functions.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A clock domain translation circuit having a signal input receiving a digital signal clocked by a first clock signal, for communicating the digital signal to an output in a second clock domain controlled by a second clock signal, the second clock signal being at a frequency less than that of the first clock signal, comprising:

a phase determining circuit, having inputs receiving the first and second clock signals, for generating a phase region signal corresponding to the phase relationship of the first clock signal to the second clock signal;

a storage circuit, coupled to the signal input and coupled to receive the first clock signal, for storing the state of the digital signal received at the signal input for at least one cycle of the first clock signal after receipt;

an output register, having a data input, and having a clock input coupled to receive the second clock signal;

a multiplexer, for selectably coupling, to the data input of the output register, the digital signal at the signal input or an output of the storage circuit, responsive to a control signal; and an arbiter circuit, coupled to the phase determining circuit and to the multiplexer, for generating the control signal to the multiplexer responsive to the phase region signal.

2. The circuit of claim 1, wherein the storage circuit comprises:

a first register, having a data input coupled to the signal input and having a clock input coupled to receive the first clock input, and having an output coupled to an input of the multiplexer;

wherein the arbiter circuit controls the multiplexer to couple the signal input to the data input of the output register responsive to the phase region signal indicating a first phase region, and wherein the arbiter circuit controls the multiplexer to couple the output of the first register to the data input of the output register responsive to the phase region signal indicating a second phase region.

3. The circuit of claim 1, wherein the digital signal is presented to the signal input responsive to a first clocking edge of the first clock signal;

wherein the first phase region indicates that a clocking edge of the second clock signal is to occur prior to a second clocking edge of the first clock signal after the first clocking edge of the first clock signal;

and wherein the second phase region indicates that a second clocking edge of the first clock signal is to occur after the first clocking edge of the first clock signal and prior to a clocking edge of the second clock signal.

4. The circuit of claim 3, wherein the storage circuit further comprises:

a second register, having a data input coupled to the output of the first register, having a clock input coupled to receive the first clock input, and having an output coupled to an input of the multiplexer;

wherein the arbiter circuit controls the multiplexer to couple the output of the second register to the data input of the output register responsive to the phase region signal indicating a third phase region.

5. The circuit of claim 4, wherein the third phase region indicates that both the second clocking edge of the first clock signal and a third clocking edge of the first clock signal are to occur after the first clocking edge of the first clock signal and prior to a clocking edge of the second clock signal.

6. The circuit of claim 1, wherein the phase determining circuit comprises:

a counter, having an input receiving a frequency ratio signal corresponding to the ratio of the frequency of the first clock signal to the frequency of the second clock signal, and having an input receiving the first clock signal, and having an output for presenting the phase region signal responsive to the frequency ratio signal and to clocking edges of the first clock signal.

7. The circuit of claim 6, wherein the counter also presents, at an output, a lineup signal indicating that clocking edges of the first and second clock signal are substantially coincident.

8. The circuit of claim 7, wherein the arbiter circuit also has an input receiving the lineup signal, for generating the multiplexer control signal responsive thereto.

9. A method of communicating a digital signal received synchronous with a first clock signal in a first clock domain to a second clock domain synchronous with a second clock signal, the second clock signal having a lower frequency than the first clock signal, comprising the steps of:

responsive to receiving the first and second clock signals, determining the phase relationship of the first clock signal relative to the second clock signal;

receiving a state of the digital signal clocked by a first clocking edge of the first clock signal;

storing a state of the received digital signal for at least one cycle of the first clock signal after the first clocking edge;

responsive to determining that the phase relationship is in a first phase region, applying the digital signal to a data input of an output register, the output register having a clock input coupled to receive the second clock signal; and responsive to determining that the phase relationship is in a second phase region, applying the stored state of the digital signal to the data input of the output register.

10. The method of claim 9, wherein the first phase region corresponds to a phase relationship in which a second clocking edge of the first clock signal is to occur after a next clocking edge of the second clock signal;

and wherein the second phase region corresponds to a phase relationship in which the second clocking edge of the first clock signal is to occur prior to the next clocking edge of the second clock signal.

11. The method of claim 9, wherein the storing step comprises:

storing the state of the received digital signal in a first register responsive to receipt of a second clocking edge of the first clock signal;

storing the state of the received digital signal in a second register responsive to receipt of both the second clocking edge and a third clocking edge of the first clock signal;

wherein an output of the first register is applied to the data input of the output register responsive to determining that the phase relationship is in a second phase region; and further comprising:

applying an output of the second register to the data input of the output register responsive to determining that the phase relationship is in a third phase region.

12. The method of claim 11, wherein the first phase region corresponds to a phase relationship in which the second clocking edge of the first clock signal is to occur after the next clocking edge of the second clock signal;

wherein the second phase region corresponds to a phase relationship in which the second clocking edge of the first clock signal is to occur prior to the next clocking edge of the second clock signal;

and wherein the third phase region corresponds to a phase relationship in which both the second clocking edge and a third clocking edge of the first clock signal are to occur prior to the next clocking edge of the second clock signal.

13. The method of claim 9, wherein the step of determining the phase relationship comprises:

resetting a counter responsive to receiving a lineup signal indicating that the first and second clock signals have edges coincident from one another;

incrementing the counter responsive to each clocking edge of the first clock signal received after the resetting step;

wherein first and second values of the counter correspond to the first and second phase regions, respectively.

14. The method of claim 13. wherein the applying step further comprises:

receiving a signal indicating the frequency ratio between the first and second clock signals;

receiving the contents of the counter; and responsive to the frequency ratio and the contents of the counter, controlling a multiplexer circuit to apply a selected one of the digital signal and the stored state to the data input of the output register.

15. A microprocessor system, comprising:

an external bus, for communicating address, data, and control signals in a manner synchronous with a bus clock;

at least one subsystem coupled to the external bus;

a clock generator circuit, for generating a bus clock and a core clock; and a microprocessor, comprising:

data processing circuitry for executing instructions performed upon digital signals, and for communicating the results of such executing upon an internal bus synchronous with the core clock; and a first clock domain translation circuit having a signal input coupled to the internal bus and having an output coupled to the external bus, comprising:

a phase determining circuit, having inputs receiving the core clock and the bus clock, for generating a phase region signal corresponding to the phase relationship of the core clock to the bus clock;

a storage circuit, coupled to the internal bus and coupled to receive the core clock, for storing the state of a digital signal on the internal bus for at least one cycle of the core clock;

an output register, having a data input, having an output coupled to the external bus, and having a clock input coupled to receive the bus clock;

a multiplexer, for selectably coupling, to the data input of the output register, the digital signal at the internal bus or an output of the storage circuit, responsive to a control signal; and an arbiter circuit, coupled to the phase determining circuit and to the multiplexer, for generating the control signal to the multiplexer responsive to the phase region signal.

16. The system of claim 15, further comprising:

a system clock generator circuit for generating a system clock signal;

and wherein the clock generator circuit receives the system clock signal, and is implemented onto a single integrated circuit with the microprocessor.

17. The system of claim 15, wherein the storage circuit comprises:

a first register, having a data input coupled to the internal bus and having a clock input coupled to receive the core clock, and having an output coupled to an input of the multiplexer;

wherein the arbiter circuit controls the multiplexer to couple the state of the internal bus to the data input of the output register responsive to the phase region signal indicating a first phase region, and wherein the arbiter circuit controls the multiplexer to couple the output of the first register to the data input of the output register responsive to the phase region signal indicating a second phase region.

18. The system of claim 17, wherein the storage circuit further comprises:

a second register, having a data input coupled to the output of the first register, having a clock input coupled to receive the core clock, and having an output coupled to an input of the multiplexer;

wherein the arbiter circuit controls the multiplexer to couple the output of the second register to the data input of the output register responsive to the phase region signal indicating a third phase region;

wherein the digital signal is clocked onto the internal bus responsive to a first clocking edge of the core clock;

wherein the first phase region indicates that a clocking edge of the bus clock is to occur prior to a second clocking edge of the core clock signal after the first clocking edge of the core clock;

wherein the second phase region indicates that a second clocking edge of the core clock signal is to occur after the first clocking edge of the core clock signal and prior to a clocking edge of the bus clock;

wherein the third phase region indicates that both the second clocking edge of the core clock signal and a third clocking edge of the core clock signal are to occur after the first clocking edge of the core clock and prior to a clocking edge of the bus clock.

19. The system of claim 15, wherein the microprocessor further comprises:

a counter, having an input receiving a frequency ratio signal corresponding to the ratio of the frequency of the core clock to the frequency of the bus clock, and having an input receiving the core clock, and having an output for presenting the phase region signal responsive to the frequency ratio signal and to clocking edges of the first clock signal.

20. The system of claim 15, wherein the microprocessor further comprises:

a counter, having an input receiving a frequency ratio signal corresponding to the ratio of the frequency of the first clock signal to the frequency of the second clock signal, and having an input receiving the first clock signal, and having an output for presenting the phase region signal responsive to the frequency ratio signal and to clocking edges of the first clock signal;

a second clock domain translation circuit, having an input coupled to the external bus and an output coupled to the internal bus, and comprising:

a register coupled to the external bus and coupled to receive the core clock, for storing the state of a digital signal on the external bus for at least one cycle of the core clock;

an output register, having a data input, having an output coupled to the external bus, and having a clock input coupled to receive the bus clock;

a multiplexer, coupled to the counter, for selectably coupling the digital signal at the internal bus to the data input of the output register responsive to not receiving the lineup signal, and for coupling an output of the storage circuit to the data input of the output register responsive to the lineup signal.

* * * * *